May 9, 1939.  J. H. MEAGHER  2,157,242
BALANCE WHEEL AND SELF-OILING WRIST PIN
Filed May 15, 1937  2 Sheets-Sheet 1

INVENTOR.
JOSEPH H. MEAGHER
BY Miller & Miller
ATTORNEYS.

May 9, 1939.  J. H. MEAGHER  2,157,242
BALANCE WHEEL AND SELF-OILING WRIST PIN
Filed May 15, 1937  2 Sheets-Sheet 2
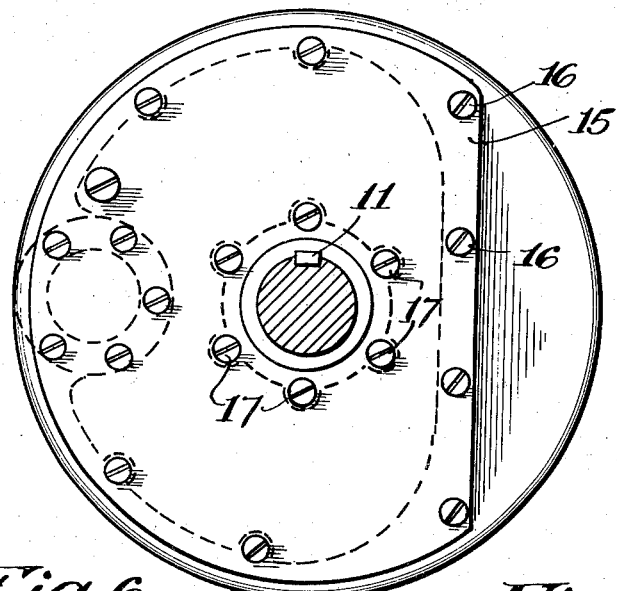
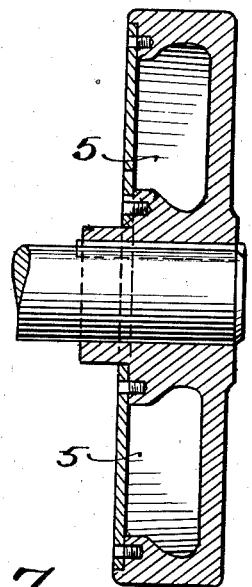
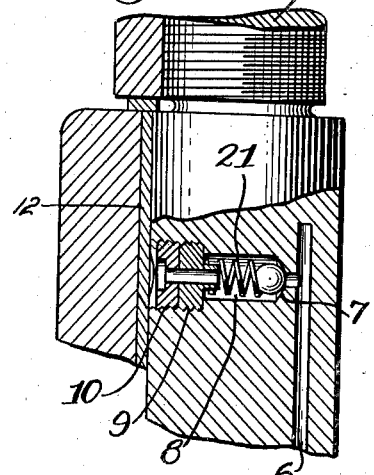
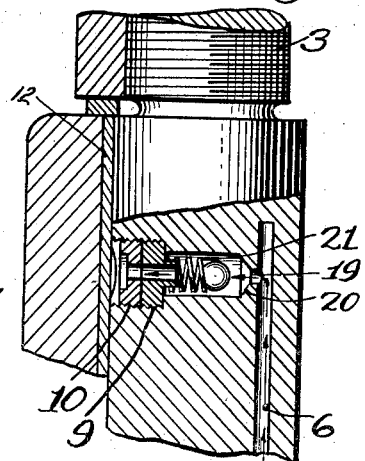
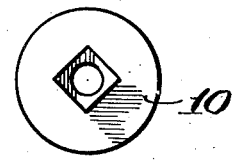
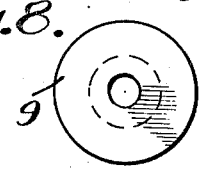
INVENTOR.
JOSEPH H. MEAGHER
BY Miller & Miller
ATTORNEYS.

Patented May 9, 1939

2,157,242

UNITED STATES PATENT OFFICE 2,157,242

BALANCE WHEEL AND SELF-OILING WRIST PIN

Joseph H. Meagher, Bessemer, Mich.

Application May 15, 1937, Serial No. 142,893

2 Claims. (Cl. 74—605)

This invention refers to a combined balance or fly-wheel and a crank or wrist pin, and means whereby lubricant may be contained in the wheel and automatically fed to the pin according to the speed of rotation of the wheel, thereby eliminating the usual wrist pin box and oiling cup, and the objectionable features incidental thereto.

A further object of this invention is to provide a self-oiling wrist or crank pin which may be used in combination with the wheel and permit lubricant to be fed to the wrist pin bearing surfaces while the wheel to which it is secured is rotating, and which will automatically cut off the feed of the lubricant supply while the wheel is at rest.

This invention of a self-oiling wrist pin having the lubricant supply contained in the flywheel is particularly intended for use on a mower, binder or a locomotive, but may likewise be used in any other type of engine or machinery where the same may be applicable.

A further object of this invention is to provide a self-lubricating wrist pin mounted on a wheel or similar rotating element wherein the lubricant will be fed to the wrist pin in proportion to the speed of the wheel or rotating element.

With the foregoing and other objects in view, as will hereinafter become apparent, this invention comprises the constructions, combinations, and arrangement of parts, hereinafter set forth, disclosed and shown on the accompanying drawings. In these drawings;

Fig. 4 is an elevational view on line 4—4 of Fig. 3.

Fig. 5 is a sectional view on line 5—5 of Fig. 4.

Fig. 6 is an enlarged sectional view showing the wrist pin lubricant feeding means.

Fig. 7 is a view similar to Fig. 6 with the lubricant feeding means in feeding position.

Figs. 8 and 9 are elevational and end views of the hollow adjusting nut for holding the lubricant feeding spring in position.

Figs. 10 and 11 are elevational and end views of the lock nut for holding the adjusting nut in proper position.

Figure 1:
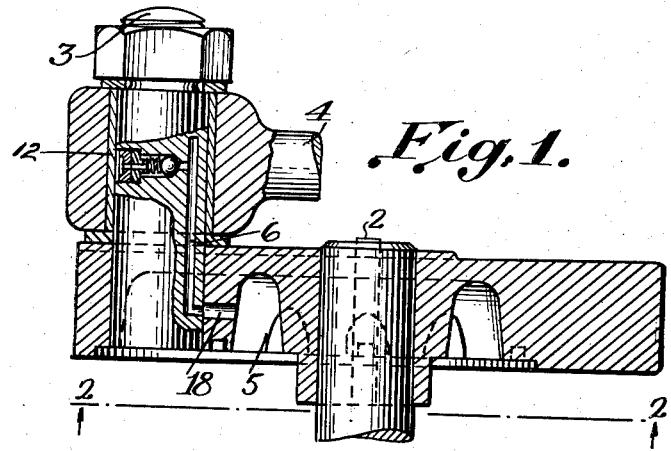
Fig. 1 is a sectional view of a flywheel and wrist pin to which this invention has been applied, being on lines 1—1 of Fig. 2.

There is shown at 1 a hollowed balance or flywheel to which this invention has been applied. Wheel 1 is keyed on a shaft 2 by means of a key or feather 11. Fixed in one side of the wheel 1 and extending transversely therefrom is a wrist or crank pin 3 on which a connecting rod or pitman 4 has a bearing as at 12.

The operation of the elements thus far described is quite conventional, i. e., the connecting rod or pitman 4 receives its power impulses from any suitable source and transmits it through wrist or crank pin 3 to the balance wheel 1, and thence to the shaft 2. The purpose of this invention is to keep this bearing 12 continuously lubricated in proportion to the speed of rotation about the pin 3, and to cut off the lubricant whenever the wheel and pin are not rotating.

Figure 2:
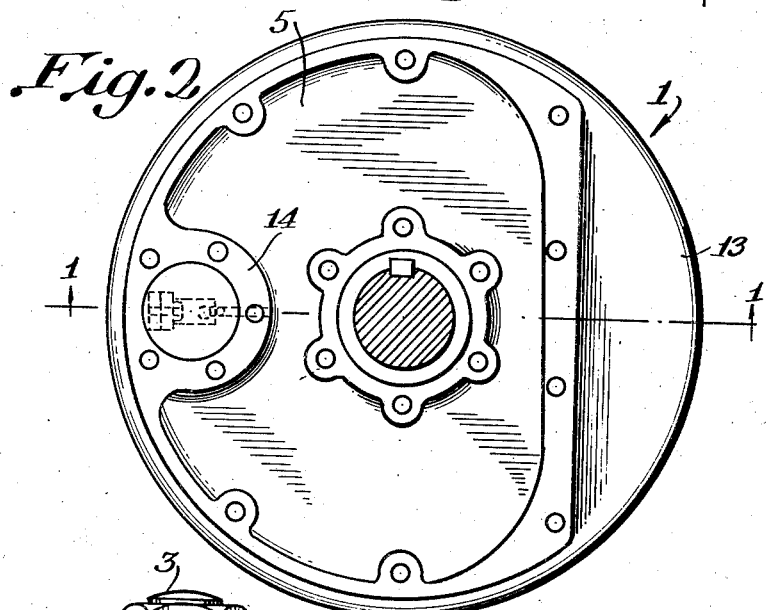
Fig. 2 is an elevational view of the flywheel, with the closure plate removed, on line 2—2 of Fig. 1.
Figure 3:
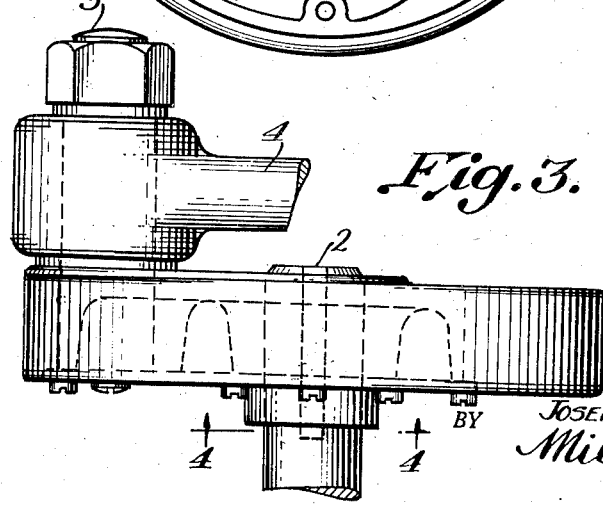
Fig. 3 is a top plan view of the flywheel and wrist pin with the compartment closure in position.

The wheel 1 is provided with a compartment 5, a sector 13 of the wheel being left free of the compartment to counterbalance the weight of the pin 3 and the boss 14 formed in the wheel in which the pin 3 is mounted. A closure plate 15 is secured by means of screws 16 and 17 to the side of the wheel to completely close the compartment, it being understood, however, that any other suitable means of securing the closure plate may be provided. With the removable closure means as shown, however, facilities are provided for replenishing the lubricant in compartment 5. Leading through the boss 14 from the compartment 5 to the wrist pin 3 is a channel 18. A conduit 6 through the wrist pin 3 connects the channel 18 to a short conduit 19 which leads to an enlarged cylindrical channel 8. It will be observed from Fig. 2 that the channel 8, the conduit 19 and the channel 18 each extend in the direction of a radius of the wheel 1. Obviously, rotation of the wheel 1 about its shaft 2 will cause any liquid lubricant within compartment 5 to tend to flow under the impetus of centrifugal force through channel 18, through the conduit 6 to the small conduit 19 and into the large channel 8. The other end of the channel 8, it will be observed, is enlarged and extends to the inside of bearing 12 within which wrist pin 3 rotates. In order to resist the flow of the lubricant through conduit 19 into the channel 8 a ball or other type valve 7 is urged against a valve seat 20 formed between the conduit 6 and conduit 19 by means of a compression spring 21 held in position by a hollow boss 22 formed on the end of a hollow nut 9 threaded into the enlarged end of the channel 8. A hollow lock nut 10 is then threaded against the hollow adjusting nut 9 and serves to hold the nut 9 in the adjusted position. By properly positioning the nut 9 within the end of the channel 8 the tension of spring 21 within the channel may be controlled. If adjustment beyond that of the strength of the spring is desired, it is obvious that a stronger or weaker spring may be substituted therefor.

In operation compartment 5 is filled with lubricant of the desired consistency. The spring 21 holds the ball valve 7 closed against its seat 20 while the wheel 1 is at rest. Whenever the wheel 1 is being rotated centrifugal force moves the ball valve 7 away from its seat 20 and at the same time forces lubricant to flow from compartment 5 through the channel 18, through the conduit 8, the conduit 9, past the ball valve seat 20, through the channel 8 and through the hollow nuts 9 and 10 to the inside of bearing 12 within which the pin 3 rotates within the pitman or connecting rod 4. By properly adjusting the strength of the spring 21 ball valve 7 will open only a slight amount while the wheel 1 is rotating slowly, allowing only a small amount of lubricant to pass through, but will open a greater amount as the wheel rotates faster, thus making the bearing 12 automatically self-lubricating in proportion to the speed of rotation of the wheel, and hence in proportion to the speed of the bearing for the lubricant.

The novel features and the operation of this device will be apparent from the foregoing description. While the device has been shown and the structure described in detail, it is obvious that this invention is not to be considered limited to the exact form disclosed, and that changes may be made therein within the scope of what is claimed, without departing from the spirit of the invention.

Having thus set forth and disclosed the nature of this invention, what is claimed is:

1. A lubricating means for a crank pin attached to a rotatable element, said rotatable element including a lubricant compartment, a conduit extending from said lubricant compartment to the bearing surface of the crank pin, said conduit having a component extending in the direction of a radius of the rotating element, whereby lubricant may flow through the channel under the impetus of centrifugal force of the rotating element, and a yieldable closure means in said conduit resisting the flow of the lubricant therethrough, said closure means having a yieldable component member extending in the direction of the radius of the rotating element whereby said closing means may open under the impetus of centrifugal force in proportion to the rate of rotation of the rotatable member.

2. An automatically self-lubricating wrist pin mounted on a rotatable element, said rotatable element having a lubricant containing compartment therein, a channel leading through said wrist pin from the lubricating compartment to the bearing surface, said channel having a component extending in the direction of a radius of the rotatable element, whereby lubricant may flow therethrough under the impetus of centrifugal force while said rotatable element is in motion, and an adjustably mounted spring pressed ball valve in said channel component closing the passage through said channel while said rotatable element is at rest, and yieldably opening in proportion to the rate of rotation of the rotatable element while said rotatable element is in motion to permit the passage of the lubricant thereby.

JOSEPH H. MEAGHER.